US005460394A

United States Patent [19]

Novi

[11] Patent Number: 5,460,394

[45] Date of Patent: Oct. 24, 1995

[54] INVALID TRANSPORT CART

[76] Inventor: Rachel Novi, 588 Cherry Hill Rd., High Falls, N.Y. 12440

[21] Appl. No.: 218,655

[22] Filed: Mar. 28, 1994

[51] Int. Cl.[6] ............................. B62M 1/00; B62B 3/02

[52] U.S. Cl. ...................... 280/79.2; 280/87.05; 135/67; 482/68

[58] Field of Search ............................ 280/79.2, 87.05, 280/87.051, 657; 135/67; 297/5; 414/921; 482/66, 67, 68, 69

[56] References Cited

U.S. PATENT DOCUMENTS

| | | | |
|---|---|---|---|
| 503,105 | 8/1893 | Tingley . | |
| 2,327,671 | 8/1943 | Rupprecht . | |
| 2,339,007 | 1/1944 | Gahm . | |
| 2,596,055 | 5/1952 | Thomas . | |
| 3,137,011 | 6/1964 | Fischer . | |
| 3,272,530 | 9/1966 | Klassen | 280/79.2 |
| 3,405,954 | 10/1968 | Wolfe . | |
| 3,938,820 | 2/1976 | Nabinger . | |
| 4,046,374 | 9/1977 | Breyley | 482/68 |
| 4,111,445 | 9/1978 | Haibeck . | |
| 4,719,655 | 1/1988 | Dean . | |
| 5,261,682 | 11/1993 | Chuang | 280/87.05 X |
| 5,351,700 | 10/1994 | Jones, III et al. | 482/66 X |

FOREIGN PATENT DOCUMENTS

| | | | |
|---|---|---|---|
| 485819 | 2/1918 | France | 482/67 |
| 2512668 | 3/1983 | France | 280/657 |
| 1241558 | 6/1967 | Germany | 280/79.2 |
| 6039007 | 2/1994 | Japan | 135/67 |
| 1048148 | 11/1966 | United Kingdom | 482/68 |

*Primary Examiner*—Brian L. Johnson
*Attorney, Agent, or Firm*—Joseph L. Spiegel

[57] ABSTRACT

An invalid transport cart includes a pair of spaced-apart wheeled base rails, vertical posts extending therefrom, a brace extending between the rails and posts, a padded seat extending between the posts above the brace and sloped towards the front of the cart, and a horizontal grip bar extending from one of the vertical posts.

5 Claims, 5 Drawing Sheets

INVALID TRANSPORT CART

BACKGROUND OF THE INVENTION

1. Field of the Invention

This invention relates generally to an invalid transport cart and more particularly to a cart used in transporting a non-ambulatory invalid or handicapped person such as a paraplegic or a person with cerebral palsy, polio, multiple sclerosis and others incapable of moving their legs. The cart is particularly useful when transporting back and forth between a wheelchair and bed.

2. Description of the Prior Art

U.S. Pat. No. 503,105 to Tingley discloses an apparatus for transporting an invalid back and forth between a bed and a chair. The device contemplates transferring a patient on a bed from a sitting position by lifting him up via a crank mechanism and then letting him down on the apparatus. The apparatus is cumbersome.

U.S. Pat. No. 2,327,671 to Rupprecht discloses a walker mechanism for invalids. It is of limited value in transporting back and forth between a wheelchair and bed since the patient must be placed in the mechanism, normally requiring at least two nurses or attendants. U.S. Pat. No. 2,339,007 to Gahm discloses a transfer and walker device that employs a rack and pinion gear mechanism for raising and lowering a patient once the patient has been placed in position on a flexible seat.

U.S. Pat. No. 2,596,055 to Thomas discloses a detachable wheel chair walking apparatus but is of limited use in transporting an invalid between bed and wheelchair.

U.S. Pat. No. 3,137,011 to Fischer pertains to a lifting and transporting apparatus primarily intended for lifting and transporting incapacitated persons in and out of automobiles.

The U.S. Pat. No. 3,405,954 to Wolfe is an example of an apparatus for attachment to a wheelchair and affords an invalid a means for raising himself out of the wheelchair.

Nabinger, U.S. Pat. No. 3,938,820 describes an invalid cart and lift that includes a vertically moveable seat for raising and lowering a patient.

Haibeck, U.S. Pat. No. 4,111,445 discloses a device for supporting a paraplegic in an upright position.

In Dean, U.S. Pat. No. 4,719,655, an invalid transfer device is described for lifting sitting patients into wheelchairs.

The above references represent prior art of which the inventor is aware. But as will be appreciated hereafter, the prior art is not specifically concerned with the problem addressed herein, namely, an invalid cart for transporting back and forth between wheelchair and bed. Moreover, the prior art devices are complex, expensive to manufacture, cumbersome to use, and in most instances, still require the presence of two nurses or attendants to position the patient where the device is to be used.

Accordingly, an object of the invention is an invalid cart useful in transporting invalids back and forth between a wheelchair and bed.

Another object is such a cart that eliminates the need for heavy lifting of the invalid by a nurse or attendant.

Still another object is such a cart that is economical in terms of cost of manufacture as well as ultimate use.

BRIEF DESCRIPTION OF THE DRAWING

Other objects and advantages of the invention will be apparent from the following detailed description and accompanying drawings, wherein.

DETAILED DESCRIPTION

Figure 1:
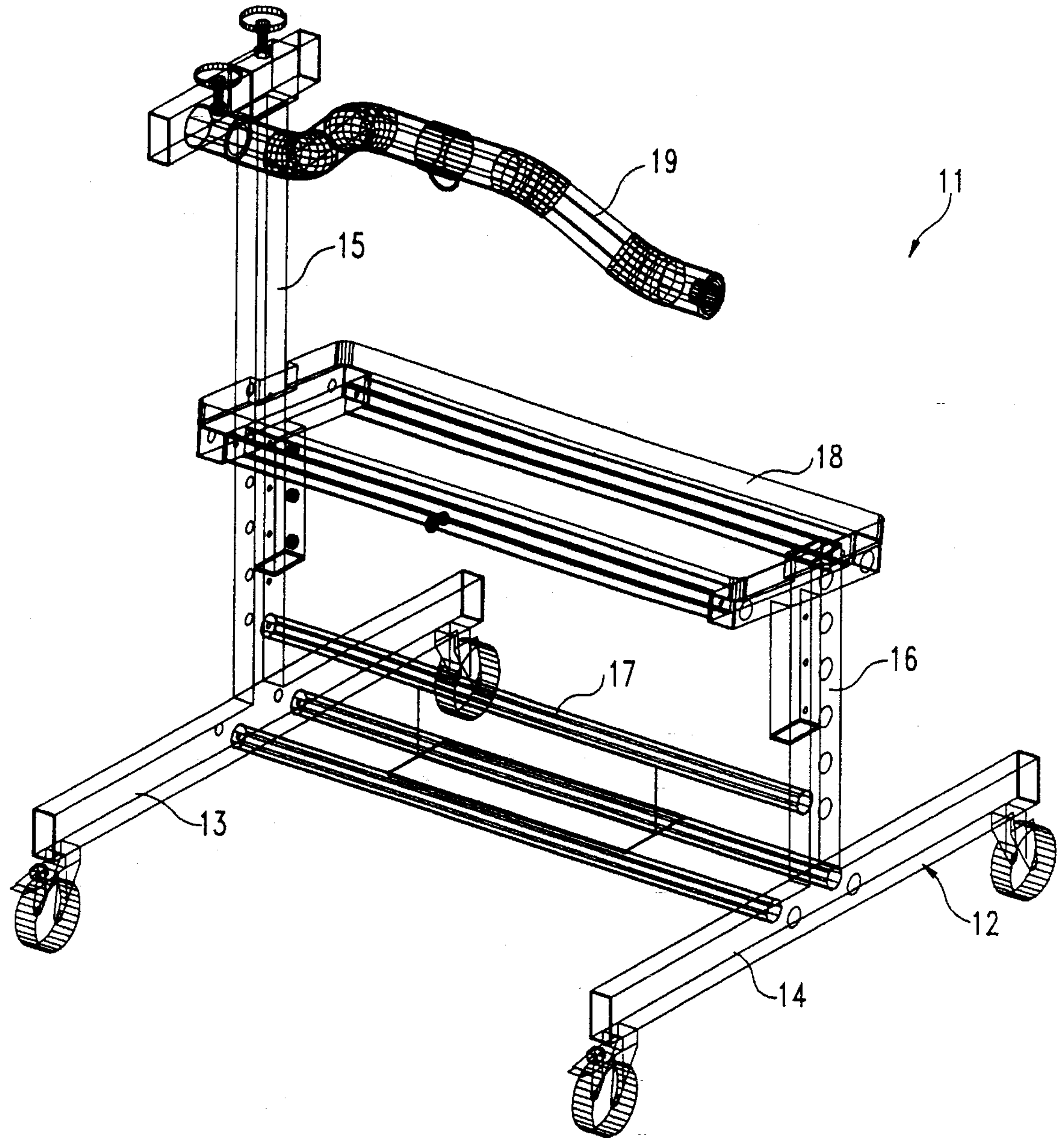
FIG. 1 is a perspective view of the invalid transport cart of the present invention.
Figure 2:
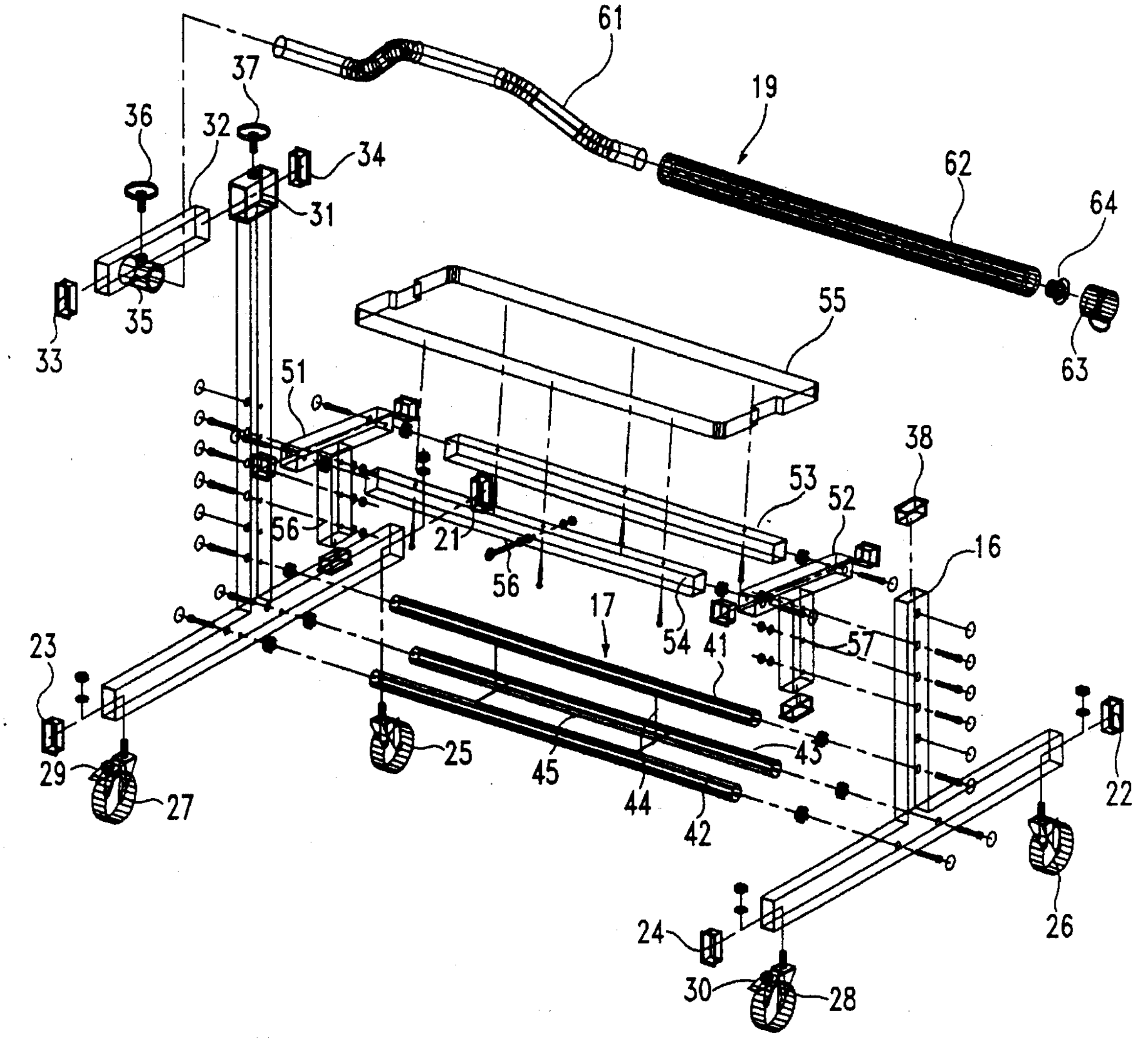
FIG. 2 is an exploded perspective view of the transport cart of the present invention.

Referring now to FIGS. 1 and 2, there is shown a preferred embodiment of the invalid transport cart 11 of the present invention. The cart is seen as including: a frame 12 that includes a pair of spaced-apart wheeled base rails 13, 14, a long 15 and a short 16 vertical post, each one secured at its lower end to a base rail 13, 14 respectively, and a brace 17 extending between the rails 13, 14 and the posts 15, 16; a padded seat 18 extending between posts 15,16 above brace 17 and sloped towards the front end of the cart; and, a horizontal gripbar 19 extending from long vertical post 15.

Each base rail 13, 14 is of steel and rectangular in cross section and provided with front 21, 22 and rear 23, 24 end caps. The rails 13, 14 are further provided with front wheels 25, 26 and rear wheels 27, 28 that also include brakes 29, 30 for locking the cart in place at certain times during use.

Each post 15, 16 is also of steel, and rectangular in cross section. Post 15 is provided at its upper end with receiver 31, slidable member 32 with end caps 33, 34, pipe stub 35 and tightening knobs 36, 37. The post 16 is provided with end cap 38. Posts 15, 16 are secured at their lower ends as by welding to rails 13, 14 approximately at the midpoint of their lengths.

A brace 17 extending between rail 13, post 15 and rail 14, post 16 includes steel tubing 41, 42, 43 spaced apart but held in a generally triangular configuration prior to assembly by steel sheet metal members 44, 45. Tubing 41 is secured at either end to the posts 15, 16 by means of screws that pass through the posts into tube connectors in the tubing 41. The screws are covered with hole caps. In a similar fashion, tubes 42, 43 are secured to rails 13, 14. The rear of sheet metal piece 45 does serve the additional function of providing a resting place for an invalid's feet.

The seat 18 is seen as including brackets 51, 52, seat support bars 53, 54, seating member 55 and vertical support members 56, 57. Each bracket 51, 52 slopes toward the front of the cart and is secured to a respective support member 56, 57 as by welding. The vertical support members 56, 57 are secured by screws to the posts 15, 16. The ends of the support bars 53, 54 are secured by screws to opposite ends of the brackets 51, 52. The brackets 51, 52 are steel, of square cross section and capped appropriately. The support bars 53, 54 are steel and of square cross section. An eye bolt 56 is secured to support bar 54 and faces rearward for a purpose to be described hereafter.

Figure 12:
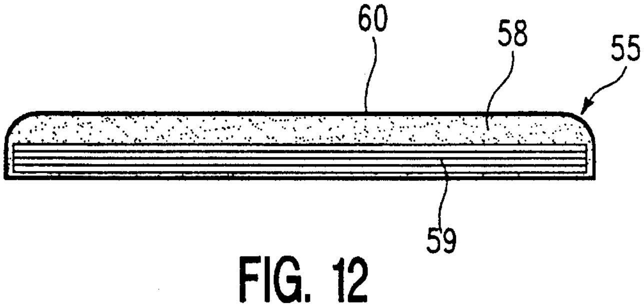
FIG. 12 is a cross sectional view of the seating member utilized in the invention.

The seating member 55 as best seen in FIG. 12 typically is high density foam 58 over a plywood base 59 with a smooth vinyl cover 60. Member 55 is secured to support bars 53, 54 by woodscrews that pass through openings in the support bars 53, 54 and screw into the wood base 59 of the seating member 55.

The horizontal gripbar 19 is seen as including a handle 61 of steel tubing, a handle grip 62 adapted to slide over handle 61, a nylon loop with "D" ring 63 to be slipped over the grip 62 and centered on the handle 61 and a handle end cap 64. The opposite end of handle 61 is adapted to be fitted snugly within pipe stub 35.

Figure 3:
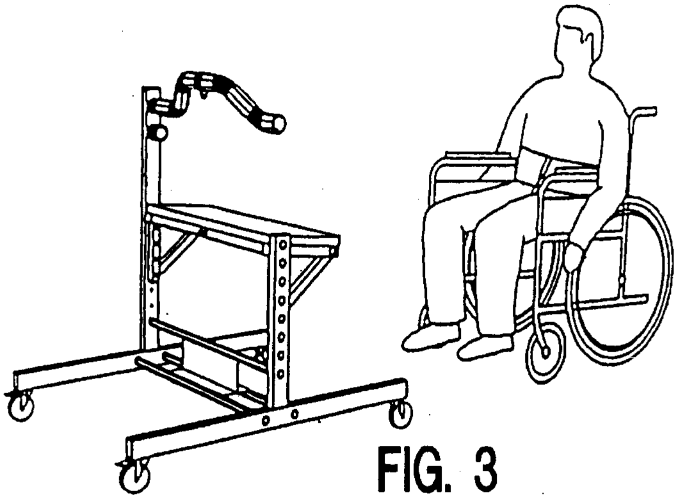
FIGS. 3–10 are progressive schematic views showing the invalid transport cart in use.

Use of the invalid transport cart is best understood with reference to FIGS. 3–10 of the drawing. In FIG. 3, the invalid is seen approaching the front of the cart on a wheelchair.

Figure 4:
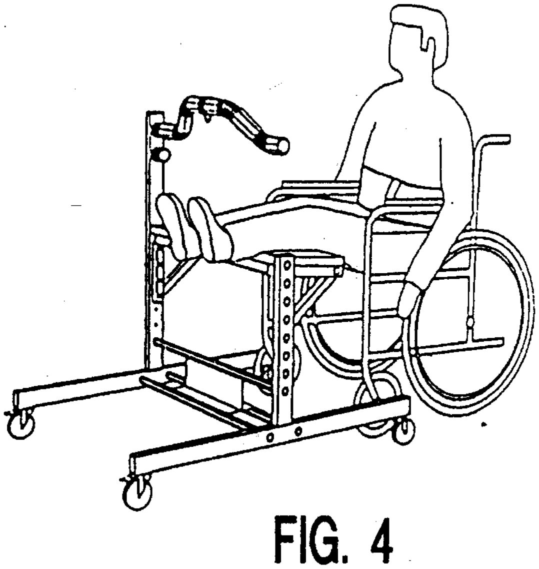

In FIG. 4, a single nurse or aide (not shown) places the legs of the invalid on the seat by raising the legs of the invalid and sliding them over the shorter post onto the seat. The rails of the cart are spaced wide enough so that the wheelchair can be moved more closely towards the seat to where the invalid, either alone or with the help of a single nurse or aide, can lift himself onto the seat by grasping the gripbar.

Figure 7:
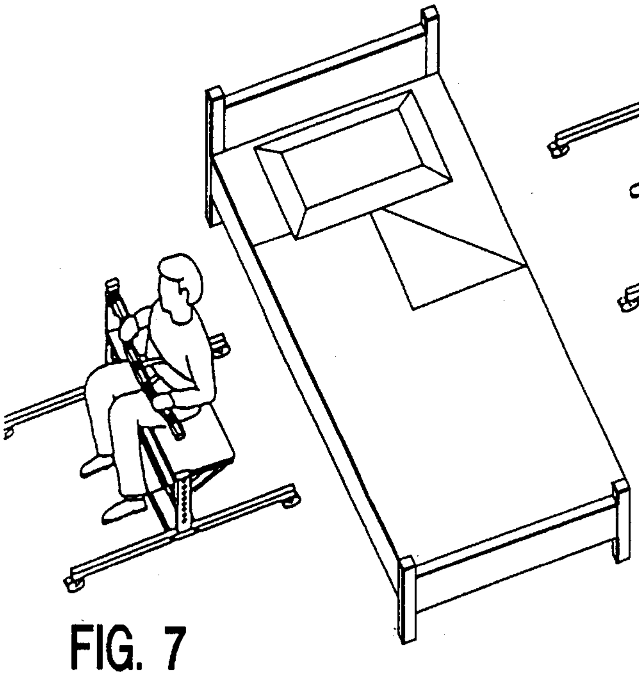
Figure 8:
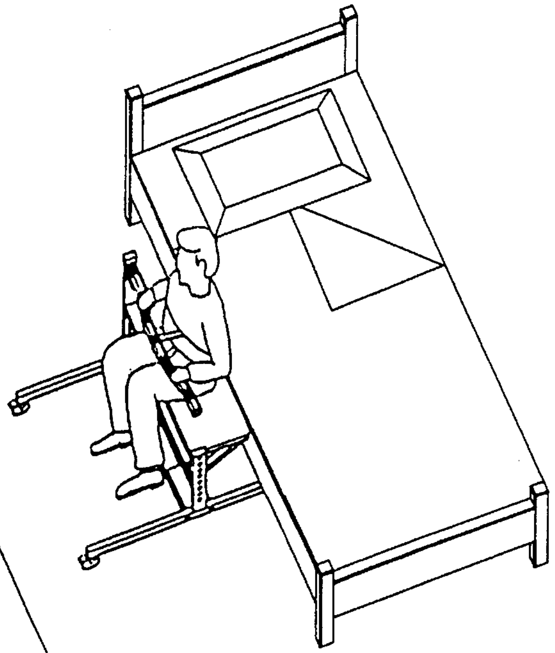
Figure 9:
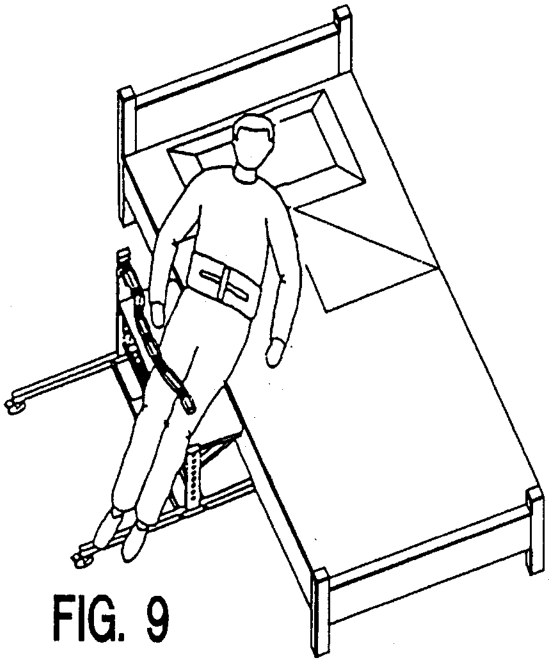

FIGS. 3–10 depict the invalid wearing a belt. The belt 71 is shown in greater detail in FIG. 11 as comprising a padded nylon portion 72, a shorter but wider hook and loop fastener 73 at one end of the belt 71, a longer but thinner hook and loop type fastener 74 at the other end of the belt, strap handles and straps 76 with clasps at the ends thereof. The belt need not be used at all, but when it is, it serves multiple purposes. By way of example and with reference to FIGS. 5 and 9, there are times when an aide must slide the invalid such as when sliding him onto the seat of the cart in FIG. 5 or when sliding him off of the cart onto a bed such as shown in FIG. 9. In a hospital setting, the invalid normally is only wearing a light gown which cannot be grasped for sliding purposes. Thus, it can be seen that the belt assists in sliding the invalid.

Figure 6:
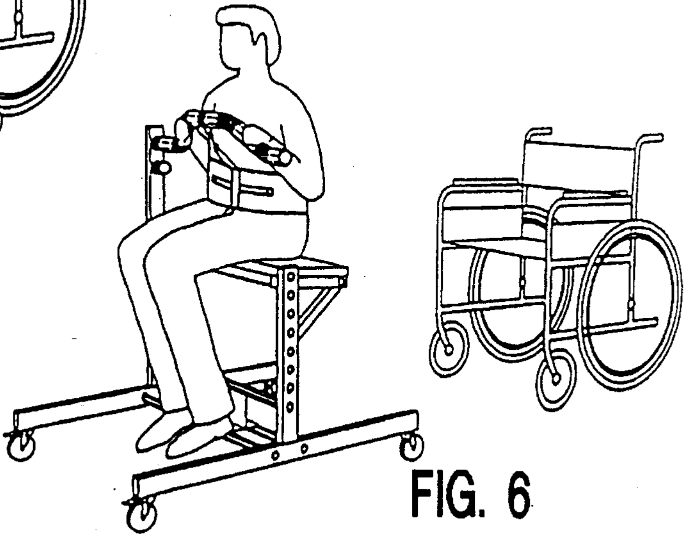

As best shown in FIG. 6, the belt clasps can be hooked to the D-ring 63 and eye bolt 56 to secure the invalid on the cart during transport.

FIG. 7 shows the invalid approaching a bed with back towards same. FIG. 8 shows the seat of the cart abutting the mattress at the level of the mattress. The rails of the cart are low enough that the cart can be brought directly against the bed with the rails sliding beneath.

Figure 10:
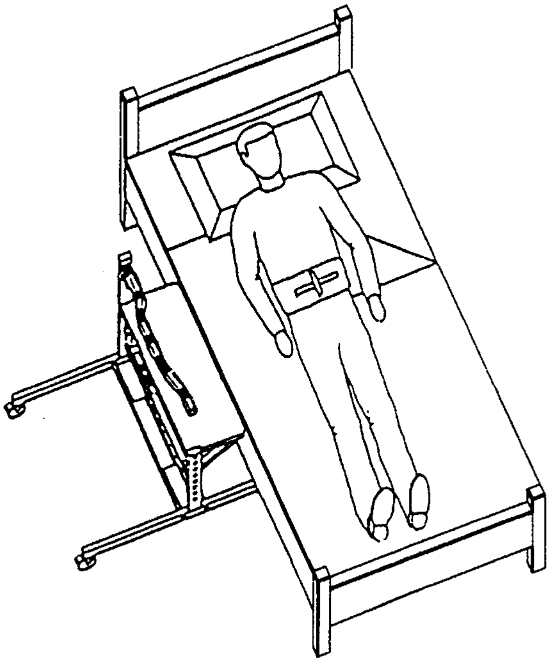
Figure 11:
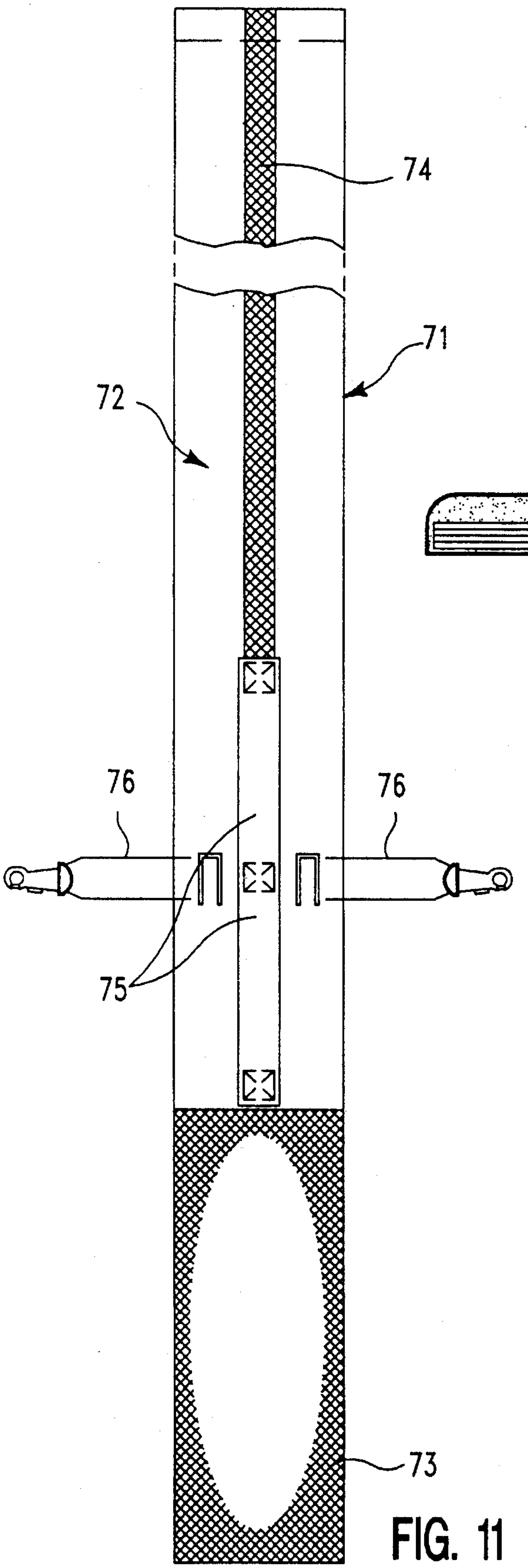
FIG. 11 is top view of the belt depicted in FIGS. 3–10.

In FIG. 9, after the straps have been unbuckled, the upper portion of the invalid can be placed on the upper portion of the bed with the invalid's legs remaining straddled across the cart seat. Then as shown in FIG. 10, the legs of the invalid are slid across the seat and onto the bed. It should be noted that, again, since the one post is shorter than the other, the legs may easily be slid across the seat onto the bed without obstruction.

Figure 5:
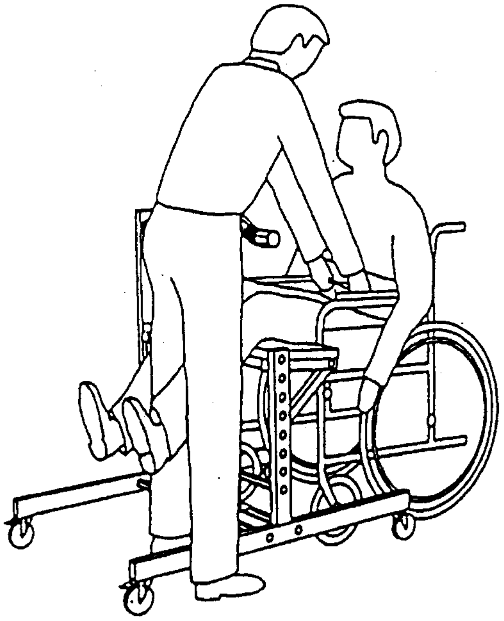

When the invalid is being transferred from the cart onto the bed, the rear wheels of the cart will be locked in place. One might also want to do this when sliding the invalid onto the cart as shown in FIGS. 4 and 5.

The cart eliminates lifting and allows even a small, untrained family member to move a handicapped person back and forth with ease. The unit is easier to operate and very affordable. The cart is sturdy, being made of steel, yet only weighs thirty pounds.

If the invalid is able, he can pull himself onto the cart, or a nurse or aide can stand behind the cart, grasp the invalid such as by a belt, and slide the invalid forward onto the smooth vinyl seat member. The entire process can be reversed when moving the invalid from the bed onto the wheelchair.

The cart is ideal for hospitals, nursing homes, rehabilitation centers, or residences. In health care facilities, it will save both time and money since only a single nurse, orderly or aide is needed for patient movement. Because the cart eliminates lifting, facility employees are less apt to miss work due to back injuries.

The cart can be used from the opposite side by reversing the position of the gripbar 19 and seat 18.

It should be obvious that changes, additions and omissions may be made in the details and arrangement of parts without departing from the spirit and scope of the invention as defined in the appended claims.

What is claimed is:

1. A cart for transporting an invalid back and forth between a wheelchair and a bed comprising:

a frame including a pair of spaced apart base rails having front and rear ends and front and rear wheels connected, respectively, to the front and rear ends of said base rails, first and second vertical posts each with upper and lower ends with the lower ends of said posts secured to and extending from a respective one of said base rails in between the front and rear ends of said base rails, and brace means secured to and extending between said base rails and vertical posts;

a seat interconnected to and extending between the upper end of said second vertical post and an intermediate portion of said first vertical post; and, a grip handle secured to and extending from said first vertical post for grasping by an invalid.

2. The cart according to claim 1 including locking means for said rear wheels.

3. The cart according to claim 1 wherein said second vertical post extends only to the approximate height of said seat to facilitate swinging an invalid's feet onto and off of said seat.

4. The invention according to claim 1 wherein the interconnection of said seats to the upper end of said second vertical post provides for the seat to slope laterally of the longitudinal direction of said cart.

5. The invention according to claim 1 wherein said handle includes means for hooking a belt worn by an invalid to secure the invalid on the cart.

* * * * *